Sept. 26, 1950 P. NELSON 2,523,321
SAFETY-TYPE BALL STUD RETAINER
Filed Nov. 18, 1946
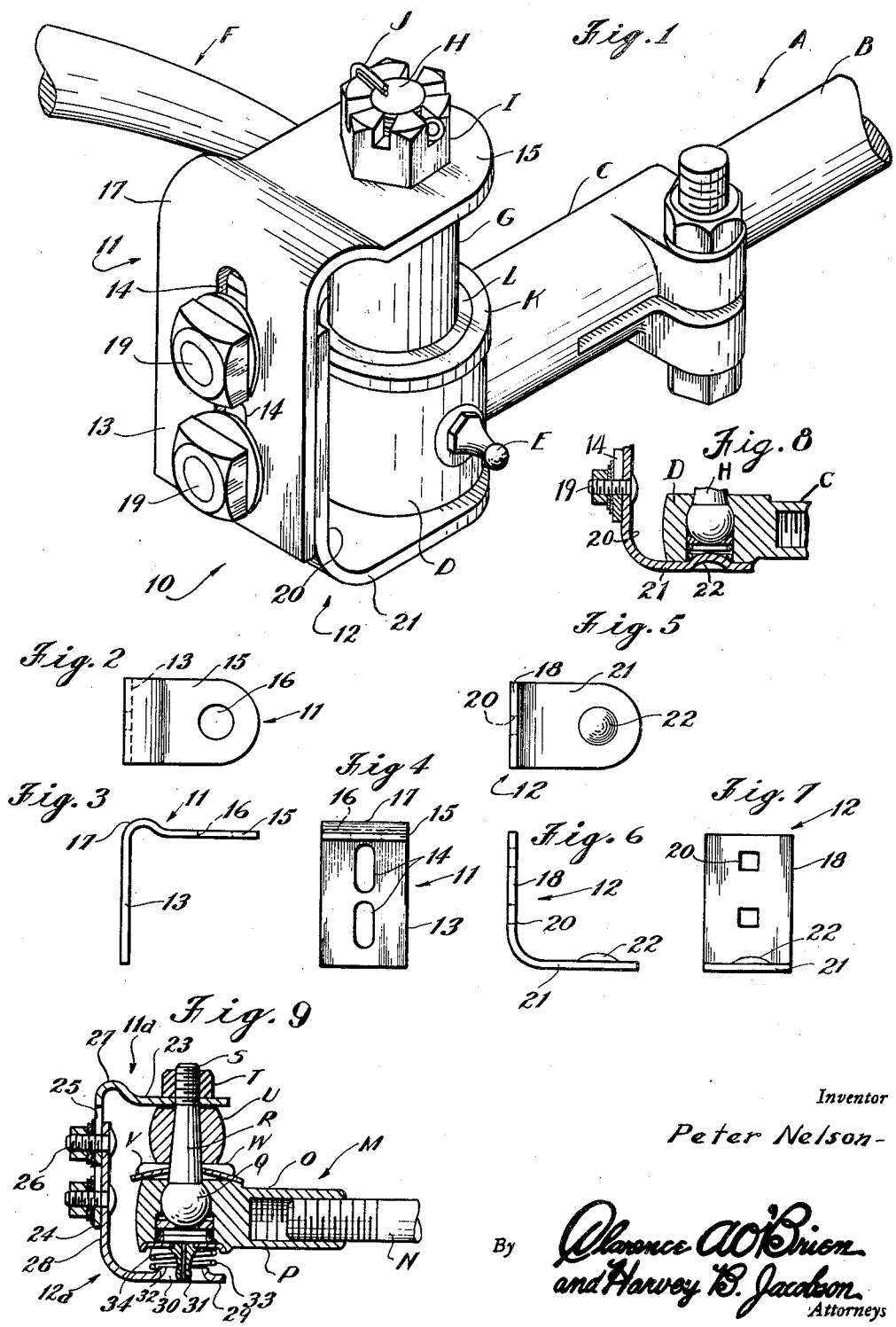
Inventor
Peter Nelson
By Clarence A. O'Brien
and Harvey B. Jacobson
Attorneys Patented Sept. 26, 1950

2,523,321

UNITED STATES PATENT OFFICE 2,523,321

SAFETY-TYPE BALL STUD RETAINER

Peter Nelson, Greenville, Mich.

Application November 18, 1946, Serial No. 710,573

2 Claims. (Cl. 287—90)

The present invention relates to a novel and improved safety-type ball stud retainer which is adapted for use in connection with co-acting ends of a tie rod and knuckle arm employed as vital parts in an automobile steering gear, said retainer constituting a guard and harnessing said ends in such a manner as to substantially prevent the ends from separating and the ball stud from accidently jumping out of its socket.

As the opening statement of the invention implies, ball stud retaining clips and guards are not broadly new. As a matter of fact, different types of guards are known and are in use and are fundamentally similar in construction and are adapted to well serve their intended purposes since when the ball and socket joint or connection between interconnected ends of the tie rod and knuckle arm becomes extensively worn, said ends are dangerously disjointed and steering control is lost to an extent that an attending accident is almost inevitable.

An object of the present invention is to structurally, functionally and otherwise improve upon the construction of ball stud retainer guards of the types known, this result being attainable through the medium of a simple and practical yoke, the latter being made up of well fitting and adjustably connected parts designed suitably to better fulfill the requirements of their intended purposes.

Another object of the invention is to provide a practical and efficient retainer guard of simple sectional construction, the sections being adjustably adjoined and of sufficient resiliency to intimately and effectively co-act with the parts with which they cooperate.

Briefly, I attain the desired ends through the medium of a U-shaped guard or yoke, this composed of upper and lower L-shaped members, the vertical limbs of said members overlapping and being adjustably connected together, and the horizontal limbs being respectively fashioned to co-act with the ball stud retainer and socketed head containing the ball portion thereof.

The foregoing and other objects and advantages of the invention will become more readily apparent from the following description and the accompanying illustrative drawings.

In the drawings, wherein like numerals are employed to designate like parts throughout the views:

Figure 1 is a perspective view showing the interconnected co-acting ends of a tie rod and knuckle arm and further showing the retainer guard, as constructed in accordance with this invention, operatively mounted in place;

Figure 2 is a top plan view of one of the parts of the retainer;

Figure 3 is an edge elevational view of the same;

Figure 4 is an end view, that is a view observing Figures 2 and 3 in the direction from right to left;

Figure 5 is a top plan view of the lower member or part of said retainer;

Figures 6 and 7 are edge and end views of said lower member;

Figure 8 is a fragmentary detail sectional view through the lower portion of the assembly seen in Figure 1, the view being on a reduced scale and serving to bring out the co-action of the parts in an obvious manner, and Figure 9 is a view in section and elevation, showing a modified version of the invention.

Reference is had first to Figure 1 and the complemental detail views, Figures 2 to 8 inclusive. In Figure 1 the conventional tie rod assembly is denoted at A and this includes a tie rod B threaded into a safety clamp socket C having a socketed head D (see Figure 8). This is the usual socket equipped head which is made to accommodate the ball stud H as shown in Figure 8. Incidentally, the complete assemblage of specific details is brought out in the fragmentary detailed showing in Figure 8, which details will be more explicitly described in covering Figure 9. Referring again to Figure 1, the reference character E designates a grease-gun fitting. The complemental knuckle arm (sometimes called a steering arm) is denoted at F and this terminates in an eye G which is lined up with the socketed head D to accommodate the ball stud, the stud which is indicated at H. In this connection it is to be pointed out that the stud is assembled and held in its socket by a castellated nut I, provided with a cotter-key J. The letter K denotes a dust cap interposed between parts D and G and held partly in place by a compressible packing ring L. It is understood that all of these are parts of the customary steering gear and form no part of the invention. The invention itself is the retainer guard 10 and this, generally speaking is formed either as a clip or so-called yoke. Said yoke is composed of two companion members, both members being L-shaped and the upper member being denoted by the numeral 11 and the lower one by the numeral 12. The vertical limb 13 of said upper member is provided with bolt accommodation slots 14 for convenient assembling and adjustment purposes. The horizontal limb 15 is provided with an opening 16 to accommodate the threaded end of the ball stud H.

The two limbs 13 and 15 are joined by way of a springy bend 17. This provides the desired degree of resiliency in the upper member of the yoke.

The lower L-member 12 has its vertical limb 18 provided with holes to accommodate nut equipped bolts 19, said bolts being anchored in place by the square holes or apertures 20 provided therefor. The remaining and horizontal limb 21 is indented and the indentation defines a boss-like detent 22 which is adapted to snap into the socket in the head B, said socket opening downwardly through said head as is evident from Figure 8.

Referring now to the modification in Figure 9, the tie rod is denoted at M and includes the rod proper N fitting into a socket O carrying the socketed head P. This is the usual socketed head formation and the socket serves to accommodate the ball Q on the stud R, said stud having the usual threaded end S to accommodate the assembling and retaining nut T. The eye on the end of the knuckle arm is indicated by the reference character U. The dust guard is denoted at V and the packing washer at W. I might explain again that all of the parts designated by reference letters are old and well known in the art and form no part of the invention.

The invention is virtually the same as that already described and shown in Figure 1 with slight improvements. Briefly, it comprises upper and lower L-shaped members 11a and 12a. The horizontal limb 23 is apertured to take care of the stud and the vertical limb 24 is slotted at 25 to accommodate the nut equipped bolts 26. The spring tensioning bend is denoted at 27. The vertical limb 28 of the lower member is adjustably bolted to the vertical limb 24 as shown and the horizontal limb 29, in this instance is provided with a struck-out opening 30 to accommodate a grease-gun fitting 31. The marginal portion of the opening is struck up to provide an annular flange 32 for anchoring a coiled spring 33 which surrounds the fitting and is interposed between same and a cap 34 received in a recess in the bottom of the socketed head P. It will be seen by contrasting the two yokes or guards with each other that the principal difference is in the provision of the opening 30, the flange 32, spring means 33 and the spring cup 34. The cup carries the grease fitting and the grease fitting protrudes into the opening 30. In this form of the invention we have spring means at both ends of the guard, the means 27 being at the top and the spring means 33 at the bottom. Considering the adjustability of the parts or members which go to make up the guard and considering further the spring facilities provided, it will be seen that said guard is aptly constructed and therefore adequate to attain the ends sought.

There is such a widespread demand for safety guards and clips of the type herein shown and described that their intended purposes and functions are well known. In such circumstances it is quite unnecessary to dwell at length upon a discussion of such factors.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

What is claimed is:

1. A safety-type ball stud retainer of the class described comprising a yoke composed of upper and lower L-shaped members, the vertical limb of said lower member being provided with nut equipped bolts, horizontal limb of said member having an opening surrounded by an upstanding annular spring seating and anchoring flange, the vertical limb of said upper member overlapping the first named vertical limb and being adjustably connected with same by way of said bolts and nuts, the horizontal limb of said upper member having a stud opening therein and adjoining its vertical limb by way of a transverse springy bend.

2. A safety-type ball stud retainer of the class shown and described comprising a stamped metal yoke composed of upper and lower complemental L-shaped members, the vertical limb of said lower L-shaped member being provided with nut equipped clamping and assembling bolts, the horizontal limb of said member having an opening for a grease fitting surrounded by an upstanding annular spring seating and anchoring flange, the vertical limb of said upper L-shaped member overlapping the first named vertical limb and being slotted and adjustably connected with same by way of said nut equipped bolts, the horizontal limb of said upper member having a stud opening therein and adjoining its vertical limb by way of a transverse spring tensioning springy bend.

PETER NELSON.

REFERENCES CITED

The following references are of record in the file of this patent:

UNITED STATES PATENTS

| Number | Name | Date |
| --- | --- | --- |
| 1,378,783 | Griffeth | May 17, 1921 |
| 1,983,670 | Knight | Dec. 11, 1934 |
| 2,208,325 | Krutsch | July 16, 1940 |
| 2,444,658 | Lucas | July 6, 1948 |

FOREIGN PATENTS

| Number | Country | Date |
| --- | --- | --- |
| 306,350 | Great Britain | 1929 |